(No Model.)
A. GEYER.
HORSE COVERING.
No. 438,105. Patented Oct. 7, 1890.
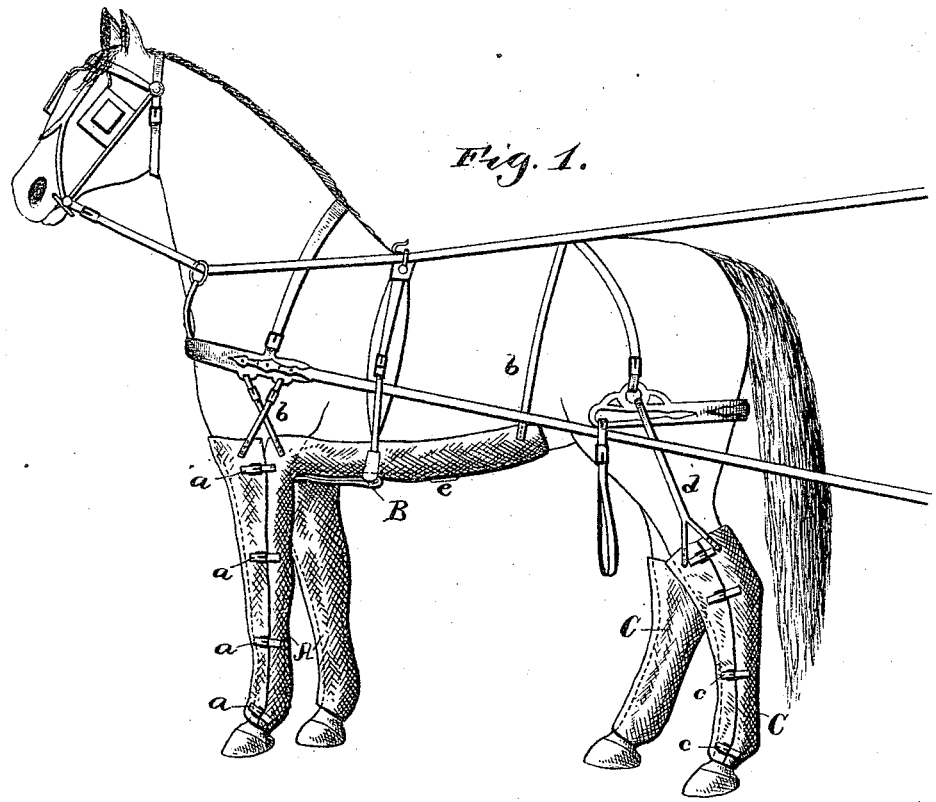
Fig. 1.
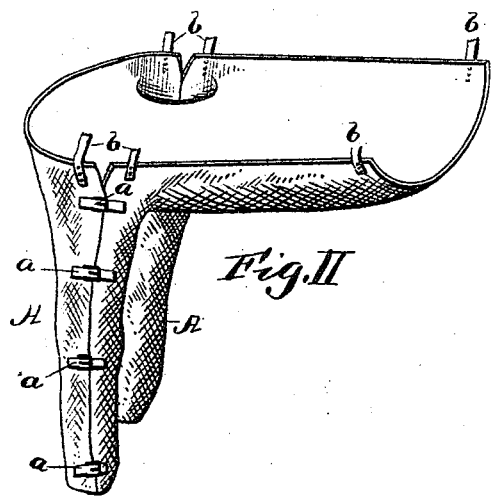
Fig. II.
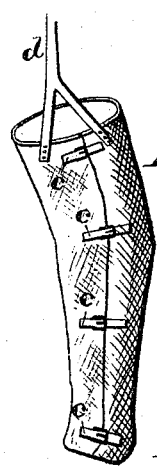
Fig. III.
Witnesses:
Inventor.
Anton Geyer
By Joseph R. Edson
Associate Atty.

UNITED STATES PATENT OFFICE.

ANTON GEŸER, OF SHALER, PENNSYLVANIA.

HORSE-COVERING.

SPECIFICATION forming part of Letters Patent No. 438,105, dated October 7, 1890.

Application filed February 17, 1890. Serial No. 340,833. (No model.)

*To all whom it may concern:*

Be it known that I, ANTON GEŸER, a citizen of the United States, residing at Shaler township, in the county of Allegheny and State of Pennsylvania, have invented certain new and useful Improvements in Coverings or Protectors for Horses; and I do hereby declare the following to be a full, clear, and exact description of the invention, such as will enable others skilled in the art to which it pertains to make and use the same, reference being had to the accompanying drawings, which form a part of this specification, in which—

Figure I indicates the figure of a horse provided with my improved leg and chest protector. Fig. II is a detailed view of the protector for the body and fore legs. Fig. III is a similar view of the protectors for one of the hind legs.

The object of my invention is to produce a device adapted to protect the legs, chest, and belly of animals from dampness and mud, and I believe I have accomplished this object by the device hereinafter specifically described, said device consisting of front and rear leggings, the former being suitably secured to a body-piece which is adapted to be secured upon the animal, as shown in Fig. I, and is made of oiled leather or other suitable material.

I will now more specifically describe my invention, reference being had to the accompanying drawings, forming part hereof, in which like letters indicate like parts wherever they occur.

A A are the front leggings, which are provided with straps and buckles $a\ a\ a$ at their outer sides, as shown in the drawings, for the purpose of securing said leggings upon said animal. Said leggings are suitably secured to a body-piece B, which extends upward over the breast and backward, covering the entire belly of said animal. At the front of said body-piece or that portion which covers the breast a V-shaped piece is inserted in order to enable said body-piece to fit neatly upon the animal. The front and rear of said body-piece are provided with straps $b\ b$, respectively, suitably secured thereto, whereby said protector may be suitably secured upon the harness, as shown in drawings.

C C are the rear leggings, conforming to the shape of the rear legs and are provided with straps and buckles $c\ c\ c$ and straps $d$, for the purpose of securing said leggings.

$e$ is a flap suitably secured upon the under side of said body-piece and adapted when closed to cover an orifice in said body-piece, which when open is adapted to permit water which may drip within said body-piece to escape.

Having described my invention, what I claim, and desire to secure by Letters Patent, is—

The herein-described protector for horses, consisting of the body-piece B, having the fore leggings A A made integral therewith and provided with the straps $b\ b$, adapted to be connected with a harness, and the hind leggings $c\ c$, each having a strap $d$, adapted to be connected with a harness, for the purpose described, substantially as set forth.

In testimony that I claim the foregoing I hereunto affix my signature this 30th day of January, A. D. 1890.

ANTON GEŸER. [L. S.]

In presence of—
GEORGE C. REESE,
C. C. LEE.